US008390791B2

(12) United States Patent
Vert et al.

(10) Patent No.: US 8,390,791 B2
(45) Date of Patent: Mar. 5, 2013

(54) LIGHT DETECTION AND RANGING SYSTEM (75) Inventors: Alexey Vasily Vert, Schenectady, NY (US); Sergei Ivanovich Dolinsky, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 390 days.

(21) Appl. No.: 12/627,442

(22) Filed: Nov. 30, 2009

(65) Prior Publication Data
US 2011/0128524 A1 Jun. 2, 2011

(51) Int. Cl.
*G01C 3/08* (2006.01)
(52) U.S. Cl. ......... 356/4.01; 356/3.01; 356/3.1; 356/4.1
(58) Field of Classification Search ........ 356/3.01–28.5, 356/139.01–139.1
See application file for complete search history.

(56) References Cited

U.S. PATENT DOCUMENTS

| | | | |
|---|---|---|---|
| 3,340,528 A | 9/1967 | Atlas | |
| 5,267,010 A | 11/1993 | Kremer et al. | |
| 5,270,795 A * | 12/1993 | Blais | 356/609 |
| 5,583,972 A | 12/1996 | Miller | |
| 5,682,236 A * | 10/1997 | Trolinger et al. | 356/484 |
| 5,724,125 A | 3/1998 | Ames | |
| 5,796,471 A | 8/1998 | Wilkerson et al. | |
| 5,872,621 A | 2/1999 | Wilkerson et al. | |
| 6,281,968 B1 * | 8/2001 | Seifert et al. | 356/3.03 |
| 6,320,272 B1 | 11/2001 | Lading et al. | |
| 6,404,494 B1 | 6/2002 | Masonis et al. | |
| 6,593,582 B2 | 7/2003 | Lee et al. | |
| 6,646,725 B1 * | 11/2003 | Eichinger et al. | 356/28 |
| 6,894,768 B2 | 5/2005 | Caldwell et al. | |
| 7,106,447 B2 | 9/2006 | Hays | |
| 7,281,891 B2 | 10/2007 | Smith et al. | |
| 7,391,557 B1 | 6/2008 | Bruch et al. | |
| 7,463,341 B2 | 12/2008 | Halldorsson et al. | |
| 2002/0027651 A1 * | 3/2002 | Jackson et al. | 356/139.09 |
| 2002/0036766 A1 | 3/2002 | Krawczyk et al. | |

(Continued)

FOREIGN PATENT DOCUMENTS

EP 1016874 A2 7/2000
EP 0970308 B1 5/2003

(Continued)

OTHER PUBLICATIONS

T.D. Wilkerson et al., "Lidar Profiling of Aerosols, Clouds, and Winds by Doppler and Non-Doppler Methods," <http://harlie.gsfc.nasa.gov/IHOP2002/Pubb&Pats/AMOS%202002%20final.pdf>; 10 pages.

(Continued)

*Primary Examiner* — Luke Ratcliffe
(74) *Attorney, Agent, or Firm* — Joseph J. Christian (57) ABSTRACT

A method of light detection includes emitting a pulsed light beam from a pulsed light source; splitting the pulsed light beam with a beam splitting device into at least two light beam ray sets, wherein at least one of the ray sets collide with airborne particulates, resulting in backscattered light; which is received through an aperture(s); and detecting the received backscattered light at a detector. A light detection and ranging system is also disclosed. The present invention has been described in terms of specific embodiment(s), and it is recognized that equivalents, alternatives, and modifications, aside from those expressly stated, are possible and within the scope of the appending claims.

25 Claims, 7 Drawing Sheets

U.S. PATENT DOCUMENTS

| | | |
|---|---|---|
| 2003/0128351 A1 | 7/2003 | Schmidt et al. |
| 2006/0227317 A1 | 10/2006 | Henderson et al. |
| 2007/0075546 A1 | 4/2007 | Avagliano et al. |
| 2007/0171397 A1 | 7/2007 | Halldorsson et al. |
| 2007/0201027 A1 | 8/2007 | Doushkina et al. |
| 2008/0030727 A1 | 2/2008 | Chin et al. |
| 2008/0180691 A1 * | 7/2008 | Hays et al. .................... 356/519 |

FOREIGN PATENT DOCUMENTS

| | | |
|---|---|---|
| JP | 63167285 | 7/1988 |
| WO | 03021291 A1 | 3/2003 |
| WO | 2007036010 A1 | 4/2007 |
| WO | 2007046875 A2 | 4/2007 |

OTHER PUBLICATIONS

L.A. Peach, "Non-Doppler laser sensor measures wind speeds," <http://www.laserfocusworld.com/display_article/30116/12/none/none/News/Non-Doppler-laser-sensor-measures-wind-speeds->; 2 pages.

S. Bradley, "High resolution wind speed profiles form a non-Doppler SODAR array," <http://www.acoustics.salford.ac.uk/res/vonhunerbein/wind_from_BASSA.pdf>; 18 pages.

M.S. Belen'kii et al., "New non-Doppler remote sensing technique for 3D wind field mapping," Abstract, SPIE, vol. 2222, No. 667, 1994, 1 Page.

JP63167285 Abstract, Jul. 11, 1088.

* cited by examiner

LIGHT DETECTION AND RANGING SYSTEM

CROSS-REFERENCE TO RELATED APPLICATIONS

The present invention is related in some aspects to commonly assigned, U.S. patent application Ser. No. 12/362,674, filed Jan. 30, 2009, entitled PARTICLE DETECTION SYSTEM AND METHOD OF DETECTING PARTICLES, the contents of which are hereby incorporated by reference in their entirety.

The present invention is related in some aspects to commonly assigned, U.S. patent application Ser. No. 12/362,595, filed Jan. 30, 2009, entitled WIND VELOCITY MEASUREMENT SYSTEM AND METHOD, the contents of which are hereby incorporated by reference in their entirety.

BACKGROUND OF THE INVENTION

The present invention relates generally to light detection and ranging (LIDAR) systems and, more particularly, to an improved light detection and ranging system and a method of light detection and ranging.

Figure 8:
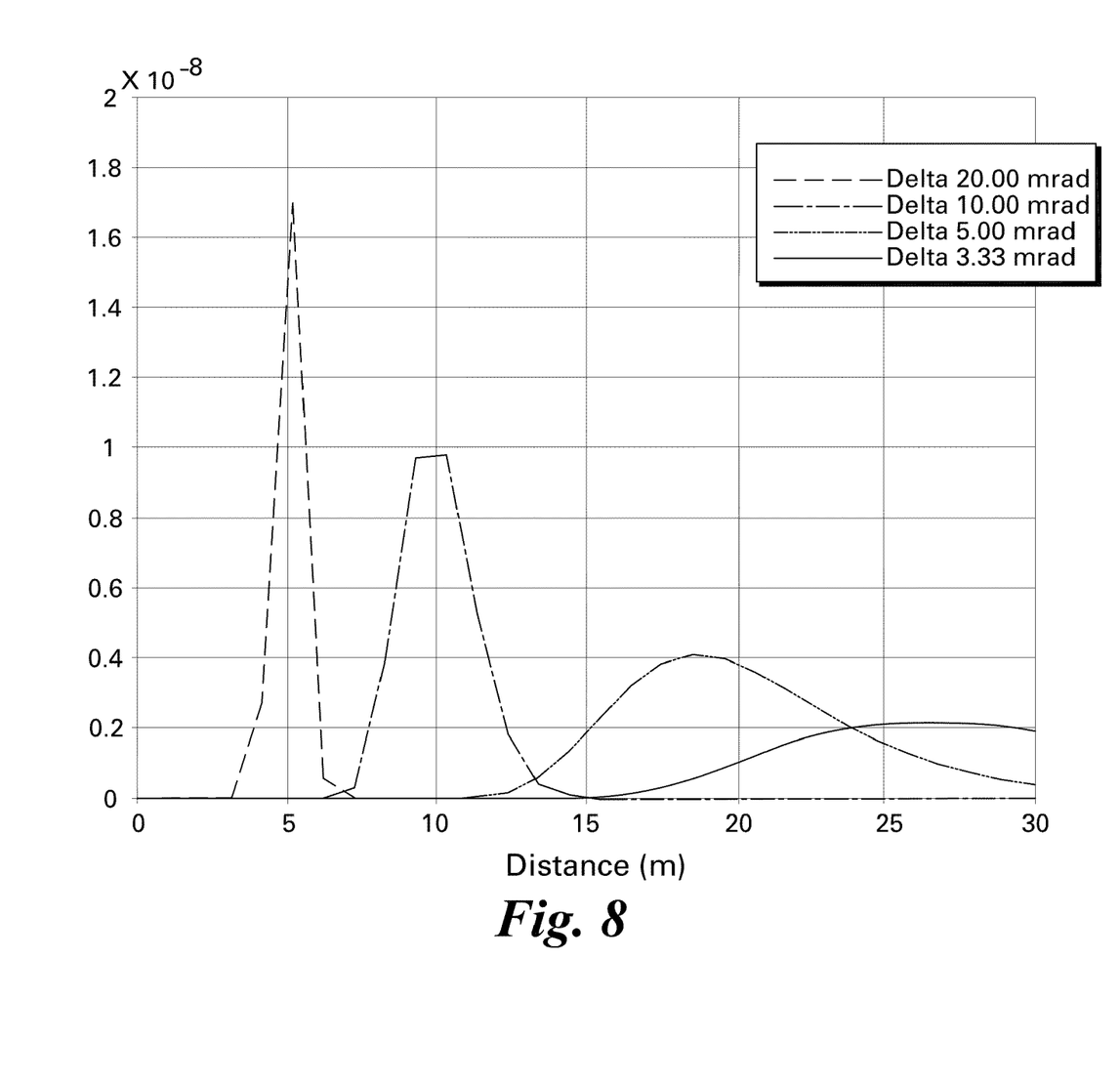
FIG. 8 is a sensitivity curve depicting sensitivity vs. distance from detector.

Typical LIDAR systems are lacking in accurate measurement capabilities for both short and long ranges at the same time. For example, FIG. 8 depicts a sensitivity curve showing sensitivity as compared to distance from the detector of the LIDAR system. The sensitivity of an ideal LIDAR system drops off precipitously (related to $1/R^2$) at distances at or above around 30 feet. This shortcoming is typically addressed by building duplicate (or more) LIDAR systems, wherein each LIDAR system covers both ranges (short and long). This solution is expensive and technically complicated.

Accordingly, there is an ongoing need for improvements in light detection and ranging systems and the methods these systems employ.

BRIEF DESCRIPTION

The present invention overcomes at least one of the aforementioned drawbacks by providing a LIDAR system and method that provides a simplified and inexpensive design, yet provides an improved range of detection. More specifically, the present invention is directed to a LIDAR system that includes splitting the primary beam into multiple beams which affords certain improvements in the LIDAR system.

Therefore, in accordance with one aspect of the invention, a method of light detection comprises emitting a pulsed light beam from a pulsed light source; splitting the pulsed light beam with a beam splitting device into a first light beam ray set and a second light beam ray set; at least one of the first light beam ray set and the second light beam ray set colliding with airborne particulates, thereby resulting in backscattered light; receiving the backscattered light through at least one aperture; and detecting the received backscattered light at a detector.

In accordance with another aspect of the invention, a light detection and ranging system comprises a housing; and a light detection and ranging device within the housing, the device comprising: a pulsed light source; a beam splitting device; and a light detection subsystem comprising: at least one aperture; and a light detector.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Aspects of the present invention have been shown to offer advantages over previous methodologies of using LIDAR systems. The system and method are able to mitigate aspects of the sensitivity curve (FIG. 8) that is inherent with traditional LIDAR systems in an efficient manner and thereby offer improved sensitivity over a wider range(s) of distances. Aspects of the present invention include employing an optical component for splitting the interrogating "primary" beam emitted from a light emission source (e.g., laser) into at least two beams and steering the beams into different portions of the illuminated path in order to cover as wide a range of distances as possible and/or a desired range(s) of distances. In embodiments, the optical component(s) of the LIDAR systems may be tuned to produce a set of secondary beams with different intensities in order to compensate for differences of receiver's detector signal from different portions of the illuminated path. Embodiments of the optical component may be composed of refractive materials, such as semitransparent mirrors, prisms, and the like. Accordingly, aspects of the invention allow for adjustment of sensitivity for different portions of the sensitivity range so that sensitivity is customizable and user-editable.

Figure 1:
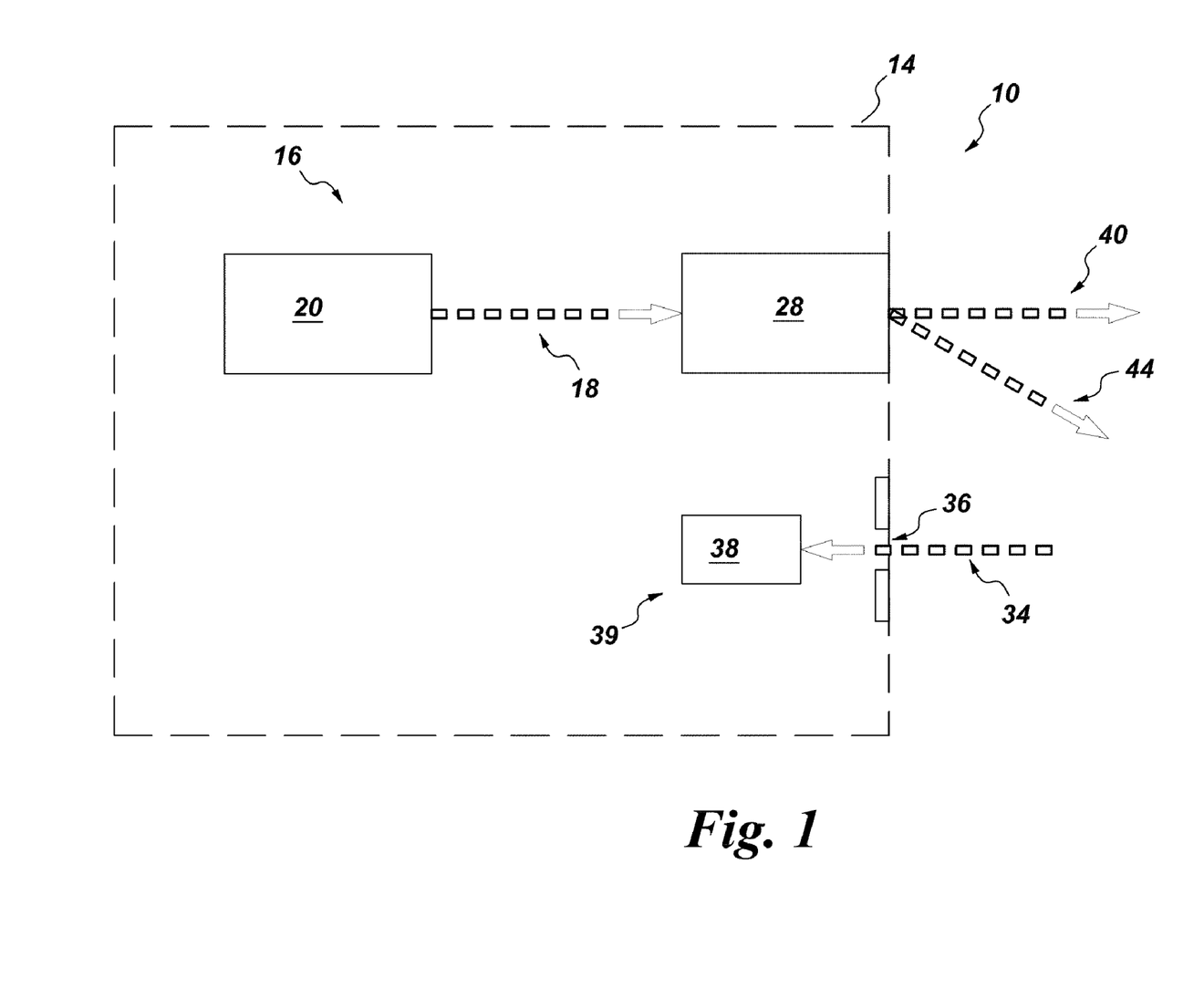
FIG. 1 is a block diagram of an exemplary embodiment a Light Detection and Ranging System (LIDAR) according to an embodiment of the present invention.

Referring to FIG. 1, a block diagram of an exemplary embodiment of a Light Detection and Ranging System (LIDAR) according to an embodiment of the present invention is disclosed. The LIDAR system, or system, 10 comprises a housing 14 that may contain a light detection and ranging device 16 within the housing 14. The device 16 comprises a pulsed light source 20, a beam splitting device 28, and light detection subsystem 39. The light detection subsystem 39 may comprise an aperture 36 and a light detector 38. The pulsed light source 20 emits a pulsed light beam 18 towards the beam splitting device 28. The beam splitting device 28 splits the received pulsed light beam 18 into at least a first (e.g., primary) light beam ray set 40 and at least one other (e.g., second) light beam ray set 44. Upon the emitted beam sets 40, 44 colliding with one or more airborne particulates 24, 24' (See e.g., FIGS. 2-4), a backscattered beam 34, 34' is returned to the light detection subsystem 39 through the aperture 36. The detector 38 detects the received backscattered light 34, 34'.

It should be apparent that various embodiments might differ from the system 10 depicted in FIG. 1 without departing from the present invention. For example, portions of the system 10 may be in different housings 14. As will be discussed herein, in some embodiments the device 16 and the detection subsystem 39 may be in different housings 14. Similarly, the airborne particulates 24, 24' may be virtually any aerosol plume, particles, etc. that result in at least a portion of backscattered light 34, 34'. For example, the system 10 may be employed for smoke detection uses. Other uses may be available including, for example, wind velocity measurement and the like.

The pulsed light source 20 may comprise any suitable device now known, or later developed, for emitting a pulsed light beam 18 in at least one ultraviolet, infrared, and visible light. For example, the pulsed light source 20 may comprise a laser, a laser diode, a light emitting diode, and/or the like.

Similarly, the beam splitting device 28 may comprise any suitable device now known, or later developed, for splitting the emitted pulsed light beam 18 into at least two light beams, or light beam ray sets 40, 44. For example, the beam splitting device 28 may comprise one of a diffraction grating, a lens, a semitransparent mirror, a mirror, a prism, and combinations thereof. Additionally, pluralities of the various devices for beam splitting may be employed as can combinations of pluralities of the devices may be employed in embodiments. As discussed herein, various and particular configurations of beam splitting may be created under aspects of the present invention.

Figure 2:
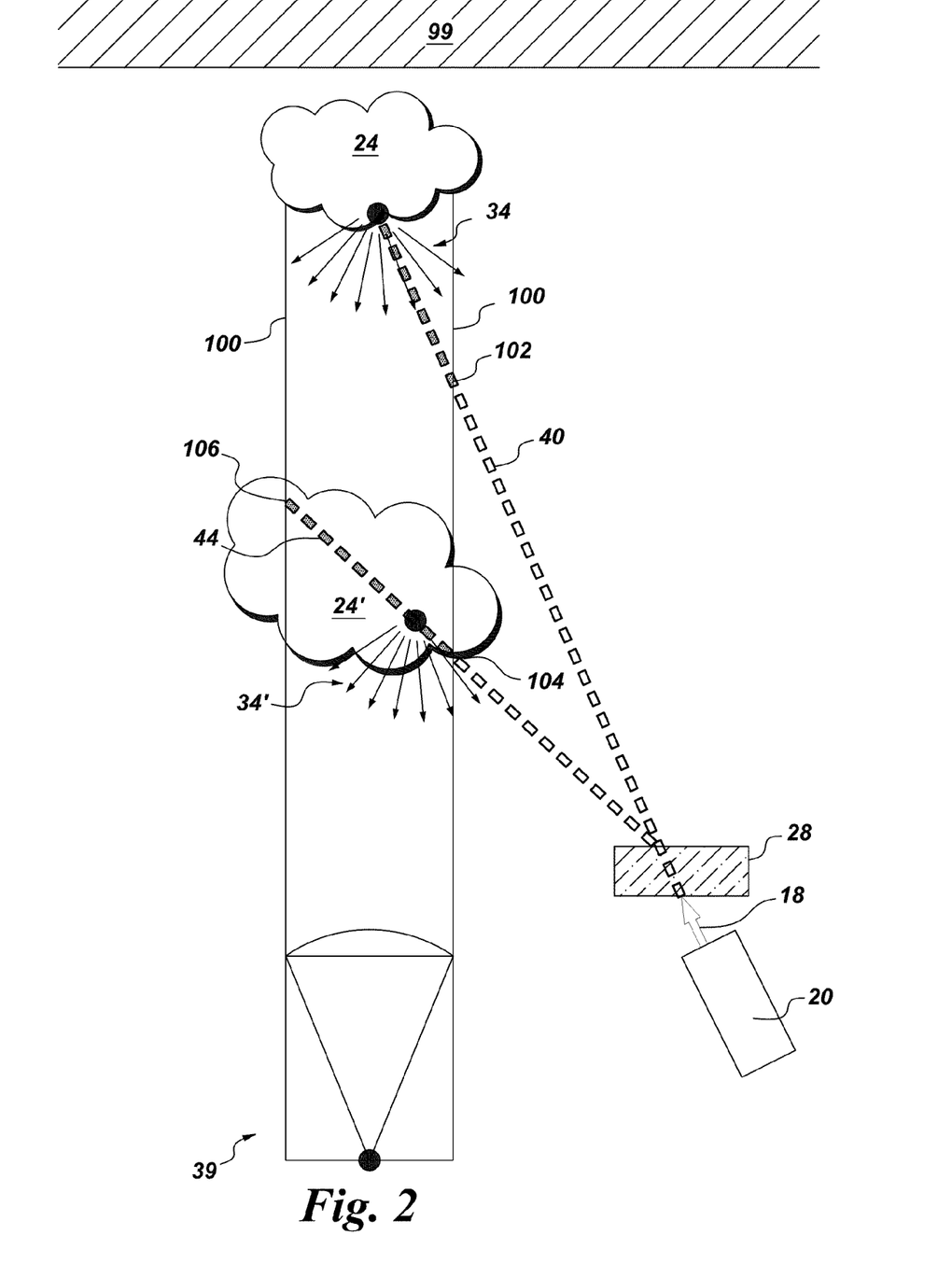
FIG. 2 is a plan view of a LIDAR system according to an embodiment of the present invention.
Figure 3:
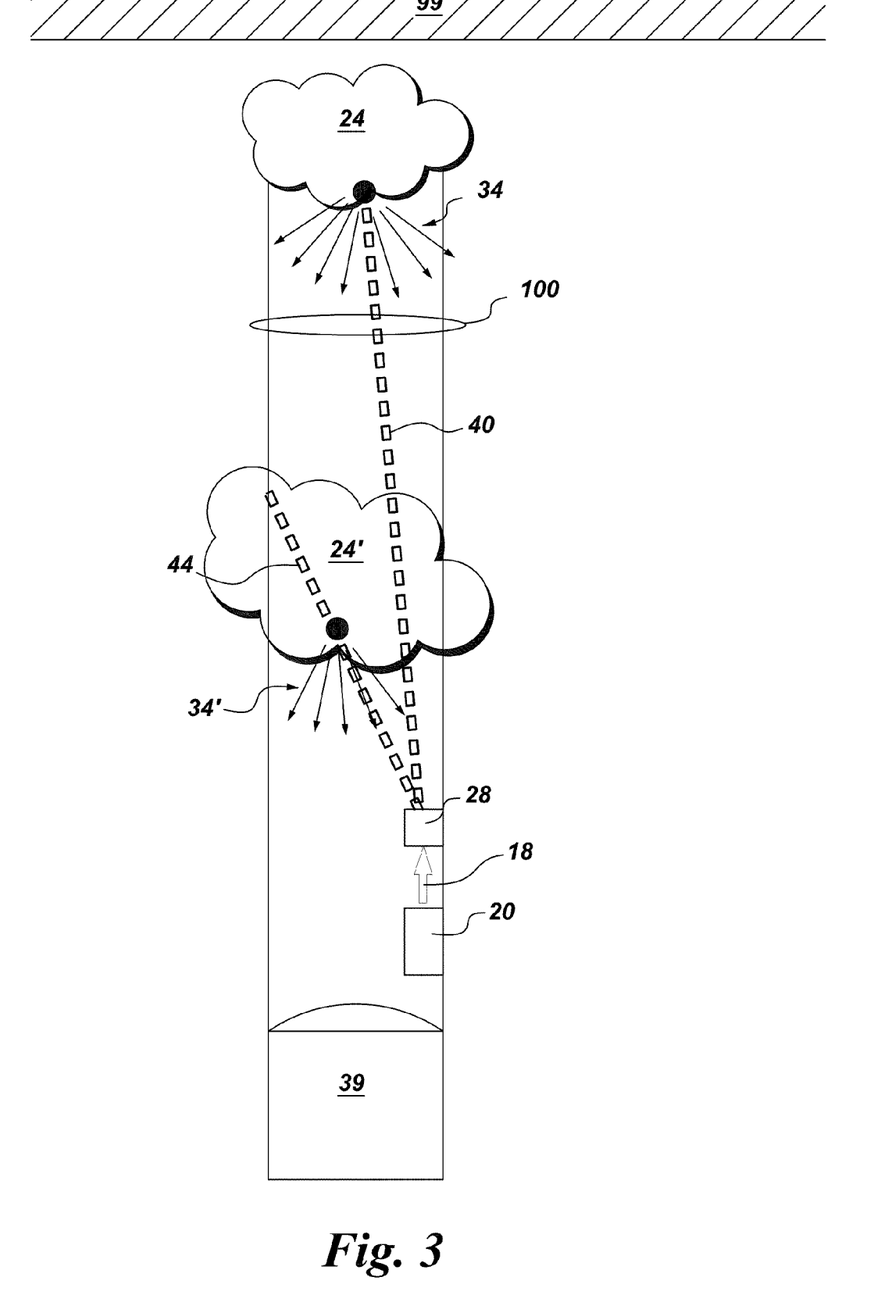
FIG. 3 is a plan view of a LIDAR system according to another embodiment of the present invention.
Figure 4:
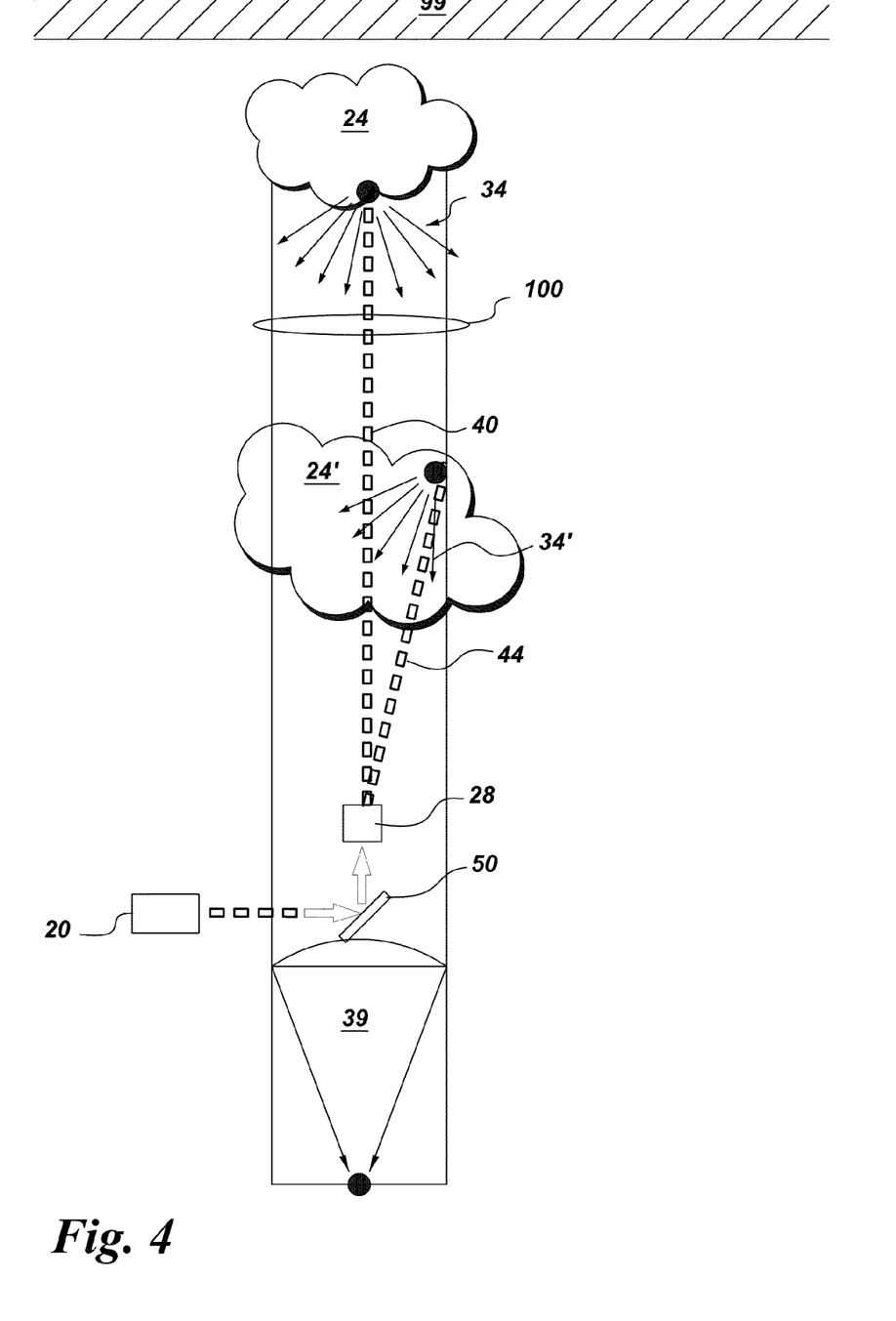
FIG. 4 is a plan view of a LIDAR system according to another embodiment of the present invention.

Referring to FIGS. 2-4, plan views of embodiments of the LIDAR system 10 are depicted in relationship to a solid object 99 (e.g., wall, etc.). The embodiment shown in FIG. 2 is termed a bi-axial design in that the detection subsystem 39 is on a first axis while the light detection and ranging device 16 has a second axis. Note that FIG. 2 is not drawn to scale for illustrative purposes. For example, the two axes may be only slightly non-parallel, wherein the detection subsystem 39 and the light detection and ranging device 16 are in a single housing 14 (See e.g., FIG. 1). The detection subsystem 39 has a field of view 100 which is typically the width of the receiving collimator beam. The light-emitting device 20 emits a pulsed light beam 18 towards the beam splitting device 28. The beam splitting device 28 splits the pulsed light beam 18 into two light beam ray sets 40, 44. The first beam ray set 40 due to its axis being aimed further from the system 10 has a range of detection, depicted as 60A, within the field of view 100 that extends from a first, near point 104 to a second, far point 106. Similarly, the second beam ray set 44 due to its axis being aimed closer to the system 10 has a range of detection, depicted as 60B, within the field of view 100 that extends from a first, near point 104 to a second, far point 106. Thus, if an aerosol plume 24, 24' is present in either of the ranges of detection 60A, 60B, the detector 39 will receive backscattered light 34, 34' therefrom. In this manner the system 10 in FIG. 2 is able to provide a range of detection that is greater and more diverse than a single beam LIDAR system.

The embodiment shown in FIG. 3 may be termed a single axial design in that the detection subsystem 39 and the light detection and ranging device 16 have axis that are parallel. Note that FIG. 3 is not drawn to scale for illustrative purposes. The detection subsystem 39 has a field of view 100 which is typically the width of the aperture 36. In this embodiment a portion of the light detection and ranging device 16 may impinge on the field of view 100 of the detection subsystem 39. The light emitting device 20 emits a pulsed light beam 18 towards the beam splitting device 28. The beam splitting device 28 splits the pulsed light beam 18 into two light beam ray sets 40, 44. The first beam ray set 40 due to its axis being aimed further from the system 10 has a range of detection, depicted as 60A, within the field of view 100 that extends from a first, near point 104 to a second, far point 106. Similarly, the second beam ray set 44 due to its axis being aimed closer to the system 10 has a range of detection, depicted as 60B, within the field of view 100 that extends from a first, near point 104 to a second, far point 106. Thus, if an aerosol plume 24, 24' is present in either of the ranges of detection 60A, 60B, the detector 39 will receive and detect backscattered light 34, 34' therefrom. In this manner the system 10 in FIG. 3 is able to provide a range of detection that is greater and more diverse than a single beam LIDAR system.

The embodiment shown in FIG. 4 may also be termed a single axial design in that the detection subsystem 39 and portions of the light detection and ranging device 16 have axis that are parallel. Note that FIG. 4 is similarly not drawn to scale for illustrative purposes. The detection subsystem 39 has a field of view 100 which is typically the width of the aperture 36. The light-emitting device 20 emits a pulsed light beam 18 towards a mirror 50 or other suitable reflection device. The mirror 50 or reflective device then reflects the pulsed light beam 18 towards the beam splitting device 28. Thus, the mirror 50 and the beam splitting device 28, but typically not the light-emitting device 20, may impinge on the field of view 100 of the detection subsystem 39. The beam splitting device 28 splits the pulsed light beam 18 into two light beam ray sets 40, 44. The first beam ray set 40 due to its axis being aimed further from the system 10 has a range of detection, depicted as 60A, within the field of view 100 that extends from a first, near point 104 to a second, far point 106. Similarly, the second beam ray set 44 due to its axis being aimed closer to the system 10 has a range of detection, depicted as 60B, within the field of view 100 that extends from a first, near point 104 to a second, far point 106. Thus, if an aerosol plume 24, 24' is present in either of the ranges of detection 60A, 60B, the detector 39 will receive and detect backscattered light 34, 34' therefrom. In this manner the system 10 in FIG. 4 is able to provide a range of detection that is greater and more diverse than a single beam LIDAR system.

Figure 5:
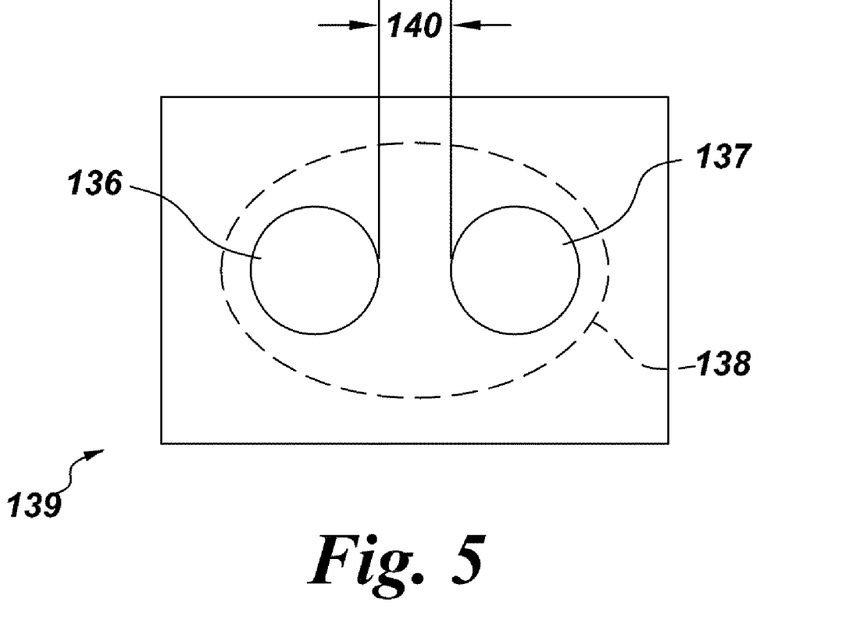
FIG. 5 is an end view of a detector portion of a LIDAR system according to an embodiment of the present invention.
Figure 6:
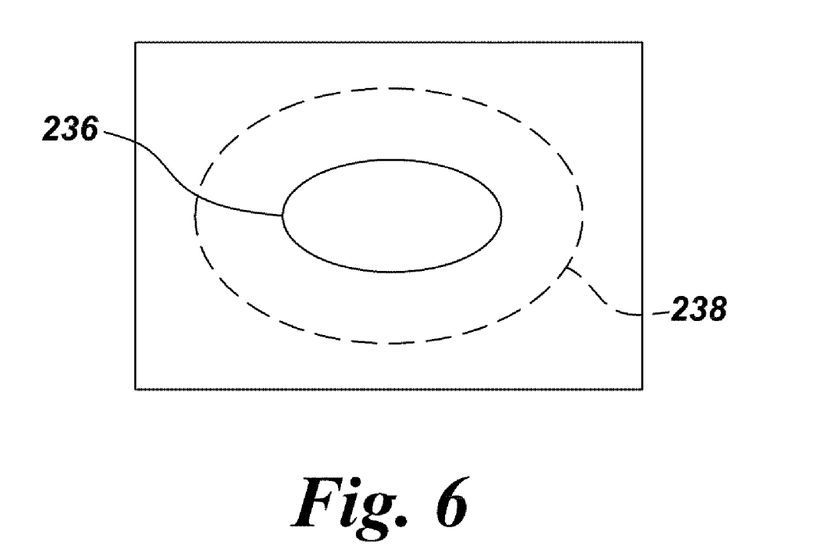
FIG. 6 is an end view of a detector portion of a LIDAR system according to another embodiment of the present invention.

Referring to FIGS. 5 and 6, end views of a portion of a detector subsystem 139, 239 are depicted. As FIG. 5 shows, two apertures 136, 137 are placed a distance 140 apart so that the detector 138 is able to receive a wider incoming span of backscattered light 34 (See e.g., FIG. 1). The distance 140 between the apertures 136, 137 may be from about 1 µm to about 1000 µm. Similarly, FIG. 6 depicts an oblong shaped aperture 236 so that the detector 238 is able to receive a wider incoming span of backscattered light 34 (See e.g., FIG. 1). Other configurations of apertures are contemplated under aspects of the present invention besides the embodiments shown in FIGS. 5 and 6. For example, the aperture may have a shape other than circular or oblong as shown. Similarly, there may be more than one or two apertures, as shown. Additionally, in some embodiments where there are a plurality of apertures, the size and/or shape of the plurality of apertures may differ.

Figure 7A:
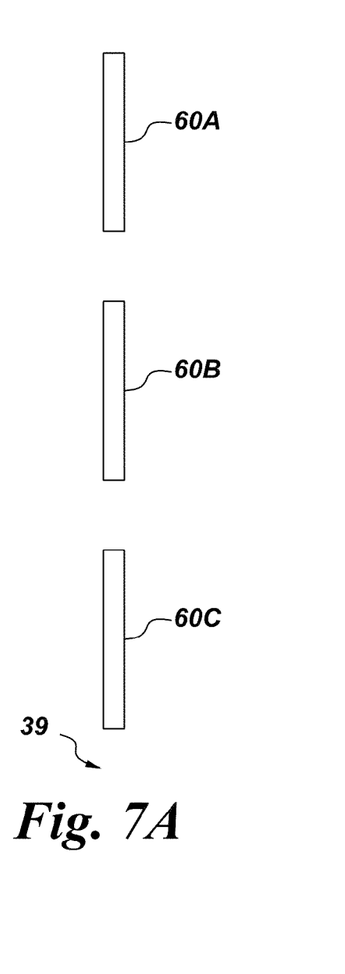
FIGS. 7A-7C are plan views of ranges of detection provided by LIDAR systems according to various embodiments of the present invention.
Figure 7B:
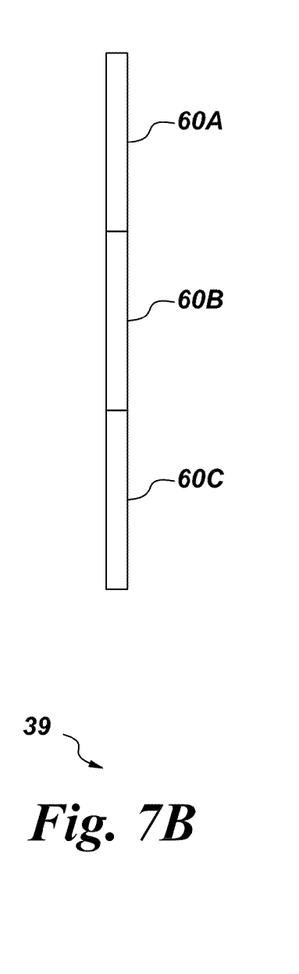
Figure 7C:
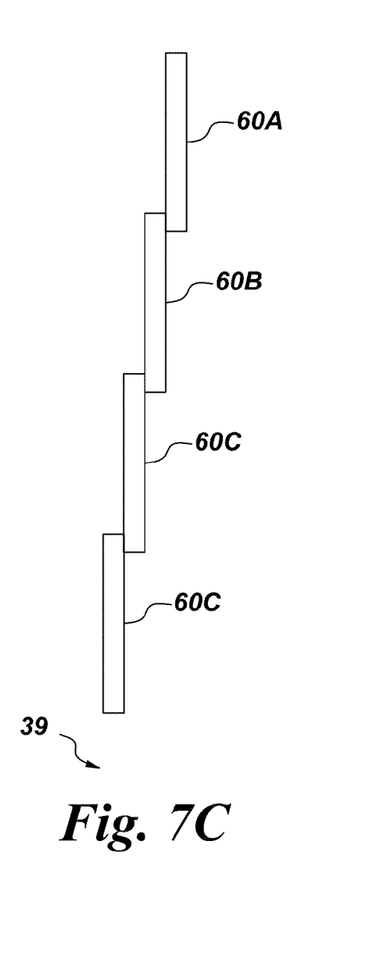

Various configurations of beam splitting devices 28 may be employed so that the detection ranges of the system 10 vary. The beam splitting device 28 may be tuned so that different portions of the illuminated path may have different intensities of light. FIGS. 7A-7C are plan views of examples of different ranges of detection available under aspects of the present invention. FIG. 7A shows a plurality of detection ranges 60A, 60B, 60C, wherein the detection ranges 60A, 60B, 60C do not overlap. A beam splitting device 28 may be employed for the embodiments shown in FIG. 7A such that the intensities in each of the detection ranges 60A, 60B, 60C are entirely the same, entirely different, or partially different. For example, the intensities in the detection ranges 60A, 60B, 60C may be approximately 33%, 33% and 33% in one embodiment (i.e., equal intensities); or, 20%, 40%, and 40% respectively in another embodiment (i.e., partially different intensities); or, 30%, 20%, and 50% respectively in another embodiment (i.e., different intensities). Clearly, other intensities and configurations of detection ranges are available.

Similarly, a beam splitting device 28 may be used to provide the intensities shown in detection ranges 60A, 60B, 60C in FIG. 7B. As shown, the detection ranges 60A, 60B, 60C substantially abut each other. The intensities may be entirely the same, entirely different, or partially different. For example, the intensities in the detection ranges 60A, 60B, 60C may be approximately 33%, 33% and 33% in one embodiment (i.e., equal intensities); or, 20%, 40%, and 40% respectively in another embodiment (i.e., partially different intensities); or, 30%, 20%, and 50% respectively in another embodiment (i.e., different intensities). Clearly, other intensities and configurations of detection ranges are available.

Similarly, a beam splitting device 28 may be used to provide the intensities shown in detection ranges 60A, 60B, 60C in FIG. 7C. As shown, the detection ranges 60A, 60B, 60C overlap each other. As with the other embodiments shown, the intensities may be entirely the same, entirely different, or partially different. For example, the intensities in the detection ranges 60A, 60B, 60C may be approximately 33%, 33% and 33% in one embodiment (i.e., equal intensities); or, 20%, 40%, and 40% respectively in another embodiment (i.e., partially different intensities); or, 30%, 20%, and 50% respectively in another embodiment (i.e., different intensities). Clearly, other intensities and configurations of detection ranges are available. In an embodiment there may be a combination of one or more of the embodiments shown and discussed herein. For example, two intensities may overlap, while two intensities may abut and/or two intensities do not abut or overlap and/or the like.

FIG. 8 depicts an exemplary sensitivity curve showing sensitivity in arbitrary units as compared to a distance from the detector in meters.

Therefore, in accordance with one aspect of the invention, a method of light detection comprises emitting a pulsed light beam from a pulsed light source; splitting the pulsed light beam with a beam splitting device into a first light beam ray set and a second light beam ray set; at least one of the first light beam ray set and the second light beam ray set colliding with airborne particulates, thereby resulting in backscattered light; receiving the backscattered light through at least one aperture; and detecting the received backscattered light at a detector.

In accordance with another aspect of the invention, a light detection and ranging system comprises a housing; and a light detection and ranging device within the housing, the device comprising: a pulsed light source; a beam splitting device; and a light detection subsystem comprising: at least one aperture; and a light detector.

The present invention has been described in terms of the preferred embodiment, and it is recognized that equivalents, alternatives, and modifications, aside from those expressly stated, are possible and within the scope of the appending claims.

What is claimed is:

1. A method of light detection comprising:
   emitting a pulsed light beam from a pulsed light source;
   splitting the pulsed light beam with a beam splitting device into a first light beam ray set having a first detection range and a second light beam ray set having a second detection range, wherein the first detection range is selected to aim the first light beam ray set to a first portion of airborne particulates at a first distance from the beam splitting device, wherein the second detection range is selected to aim the second light beam ray set to a second portion of the airborne particulates at a second distance from the beam splitting device, the second distance being lesser than the first distance;
   at least one of the first light beam ray set and the second light beam ray set colliding with airborne particulates, thereby resulting in backscattered light;
   receiving the backscattered light through at least one aperture; and
   detecting the received backscattered light at a detector.

2. The method of claim 1, wherein the pulsed light beam is one of ultraviolet, infrared, and visible light.

3. The method of claim 1, wherein the pulsed light source is one of a laser, a laser diode, and a light emitting diode.

4. The method of claim 1, wherein the beam splitting device is one of a diffraction grating, a lens, a semitransparent mirror, a mirror, a prism, and a combination thereof.

5. The method of claim 1, further comprising aiming the first light beam ray set having the first detection range and aiming the second light beam ray set having the second detection range, wherein the first detection range and the second detection range are different.

6. The method of claim 5, wherein the first detection range and the second detection range abut or overlap.

7. The method of claim 5, wherein a light emission intensity of the first light beam ray set and the second beam ray set are substantially different.

8. The method of claim 5, wherein a light emission intensity of the first light beam ray set and the second beam ray set are substantially similar.

9. The method of claim 1, wherein the at least one aperture comprises two apertures spaced apart at a distance.

10. The method of claim 9, wherein the distance is in a range between about 1 μm and about 1000 μm.

11. The method of claim 1, wherein the at least one aperture is one of oblong-shaped and tapered-shaped.

12. The method of claim 1, wherein the splitting the pulsed light beam further comprises splitting the pulsed light beam into at least three light beam ray sets.

13. A light detection and ranging system comprising:
    a housing; and
    a light detection and ranging device within the housing, the device comprising:
      a pulsed light source configured to emit a pulsed light beam;
      a beam splitting device configured to split the pulsed light beam into a first light beam ray set having a first detection range and a second light beam ray set having a second detection range, wherein the first detection range is selected to aim the first light beam ray set to a first portion of airborne particulates at a first distance from the beam splitting device, wherein the second detection range is selected to aim the second light beam ray set to a second portion of the airborne particulates at a second distance from the beam splitting device, the second distance being lesser than the first distance; and
      a light detection subsystem comprising:
        at least one aperture; and
        a light detector.

14. The light detection and ranging system of claim 13, wherein the pulsed light source is configured to emit one of ultraviolet, infrared, and visible light.

15. The light detection and ranging system of claim 13, wherein the pulsed light source is one of a laser, a laser diode, and a light emitting diode.

16. The light detection and ranging system of claim 13, wherein the beam splitting device is one of a diffraction grating, a lens, a semitransparent mirror, a mirror, a prism, and a combination thereof.

17. The light detection and ranging system of claim 13, wherein the beam splitting device is configured to aim a first light beam ray set at the first detection range and aim a second light beam ray set at the second detection range, wherein the first detection range and the second detection range are different.

18. The light detection and ranging system of claim 17, wherein a light intensity of the first beam ray set and the second beam ray set are different.

19. The light detection and ranging system of claim 13, wherein the at least one aperture comprises two apertures spaced apart a distance.

20. The light detection and ranging system of claim 19, wherein the distance is in a range between about 1 μm and about 1000 μm.

21. The light detection and ranging system of claim 13, wherein the at least one aperture is one of oblong-shaped and tapered-shaped.

22. The light detection and ranging system of claim 13, further comprising a reflection device between the pulsed light source and the beam splitting device.

23. The light detection and ranging system of claim 13, wherein the pulsed light source is offset a distance from a field of view of the light detection subsystem.

24. The light detection and ranging system of claim 13, wherein the pulsed light source is within a field of view of the light detection subsystem.

25. The light detection and ranging system of claim 13, wherein the beam splitting device is configured to split a pulsed light beam from the pulsed light source in at least three ray beam sets.

* * * * *